US011225441B2

(12) United States Patent
Belov et al.

(10) Patent No.: US 11,225,441 B2
(45) Date of Patent: *Jan. 18, 2022

(54) CHROMIUM-FREE SILICATE-BASED CERAMIC COMPOSITIONS WITH REDUCED CURING TEMPERATURE

(71) Applicant: Praxair S.T. Technology, Inc., Danbury, CT (US)

(72) Inventors: Irina Belov, Zionsville, IN (US); Daryl Copeland, Greenwood, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/163,893

(22) Filed: Oct. 18, 2018

(65) Prior Publication Data

US 2020/0123070 A1 Apr. 23, 2020

(51) Int. Cl.
| | | |
|---|---|---|
| *C04B 41/50* | (2006.01) | |
| *C04B 35/628* | (2006.01) | |
| *C04B 35/74* | (2006.01) | |
| *C04B 41/51* | (2006.01) | |
| *B82Y 30/00* | (2011.01) | |
| *B82Y 40/00* | (2011.01) | |

(52) U.S. Cl.
CPC .... *C04B 41/5024* (2013.01); *C04B 35/62807* (2013.01); *C04B 35/74* (2013.01); *C04B 41/5155* (2013.01); *B82Y 30/00* (2013.01); *B82Y 40/00* (2013.01); *C04B 2235/3229* (2013.01); *C04B 2235/402* (2013.01); *C04B 2235/72* (2013.01)

(58) Field of Classification Search
CPC ....... C04B 14/30; C04B 20/008; C04B 22/04; C04B 28/26; C04B 35/74; C04B 35/62807; C04B 40/065; C04B 41/5024; C04B 41/5155; C04B 2103/0008; C04B 2111/26; C04B 2111/10; C04B 2111/28; C04B 2111/00525; C04B 2235/402; C04B 2235/72; C04B 2235/3229; C09D 1/02; C09D 5/103; C09D 183/02; C23C 24/08; C23C 24/085; B82Y 30/00; B82Y 40/00
See application file for complete search history.

(56) References Cited

U.S. PATENT DOCUMENTS

| | | |
|---|---|---|
| 3,248,249 A | 4/1966 | Collins, Jr. |
| 3,248,250 A | 4/1966 | Collins, Jr. |
| 3,248,251 A | 4/1966 | Collins, Jr. |
| 4,319,924 A | 3/1982 | Collins, Jr. et al. |
| 4,381,323 A | 4/1983 | Lowe et al. |
| 6,171,704 B1 | 1/2001 | Mosser et al. |
| 7,993,438 B2 | 8/2011 | Mosser et al. |
| 9,017,464 B2 | 4/2015 | Belov et al. |
| 9,322,101 B2 | 4/2016 | Belov et al. |
| 9,394,448 B2 | 7/2016 | Belov et al. |
| 2006/0166014 A1 | 7/2006 | Klotz et al. |

FOREIGN PATENT DOCUMENTS

| | | | |
|---|---|---|---|
| CN | 106883645 A | 6/2017 | |
| EP | 1644451 B1 | 4/2006 | |
| EP | 2730679 A1 | 5/2014 | |
| EP | 2966193 A1 * | 1/2016 | ............. C23C 28/04 |
| KR | 101201756 B1 * | 11/2012 | |
| KR | 101201756 B1 | 11/2012 | |
| WO | 2004053194 A1 | 6/2004 | |

OTHER PUBLICATIONS

Mitchell et al "Atomically-precise colloidal nanoparticles of cerium dioxide" Nature Communications, DOI 10.1038/s41467-017-01672-4, Published online Nov. 13, 2017, pp. 1-7.*
Warren M. Garrison, Ultrahigh-strength steels for aerospace applications, JOM—The Journal of the Minerals, Metals and Materials Society, May 1990, v. 42, pp. 20-25, DOI: 10.1007/BF03220942, https://www.researchgate.net/publication/257275543.
Jana Hornikova et al., Influence of Tempering Temperature on Mechanical Properties of Ultra-High Strength Low-Alloy Steels, pp. 1-11, Brno University of Technology, Czech Republic, https://www.phase-trans.msm.cam.ac.uk.
V.A. Voitovich et al., Curing Agents of Silicate Based Adhesives, ISSN 1995-4212, Polymer Science, Series D. Glues and Sealing Materials, 2010, vol. 3, No. 3, pp. 174-176, Pleiades Publishing Ltd., 2010, Nizhni Novgorod State University of Architecture and Civil Engineering, ul. Il'inskaya 65, Nizhni Novgorod, 603950 Russia, DOI: 10:1134/S1995421210030032.
H. Bahri et al., The effect of curing time and curing temperature on the corrosion behavior of nanosilica modified potassium silicate coatings on AA2024, v. 254, 2014, pp. 305-312, Surface and Coatings Technology, ScienceDirect, http://dx.doi.org/10.1016/j.surfcoat.2014.06.041, 0257-8972/ 2014 Elsevier B.V.
Pan Ni et al., On the origin of the oxidizing ability of ceria nanparticles, RSC Advances, The Journal of Royal Society of Chemistry, RSC Adv. 2015, 5, 97512, pp. 1-8, College of Resources and Environmental Sciences, China Agricultural University, Beijing 100193, PR China, DOI: 10.1039/c5ra0700b, www.rsc.org/advances.

(Continued)

*Primary Examiner* — Anthony J Green
(74) *Attorney, Agent, or Firm* — Nilay S. Dalal

(57) ABSTRACT

A composition based on a certain chromium-free silicate-based binder is described. The composition is an aqueous solution of lithium-doped potassium silicate in combination with an aluminum or aluminum alloy powder, zinc powder or a combination thereof. The coatings of the present invention are capable of achieving a full cure at temperatures as low as 350-450 degrees F. by the inclusion of a colloidal solution of a nano-sized ceria, thus making the coatings especially suitable for application on temperature sensitive base materials.

24 Claims, 11 Drawing Sheets

(10 of 11 Drawing Sheet(s) Filed in Color)

(56) References Cited

OTHER PUBLICATIONS

Can Xu et al., Cerium oxide nanoparticle: a remarkably versatile rare earth nanomaterial for biological applications, NPG Asia Materials (2014) 6, e90; doi: 10.1038/am.2013.88, 2014 Nature Publishing Group, www.nature.com/am, pp. 1-16, published online Mar. 7, 2014.

* cited by examiner

Fig. 1(a) Cure 450 degrees F/ 2 hrs
After 24 hrs Salt Spray
Fig. 1 (b) Cure 650 degrees F/0.5 hrs
After 400 hrs Salt Spray     After 1,150 hrs Salt Spray
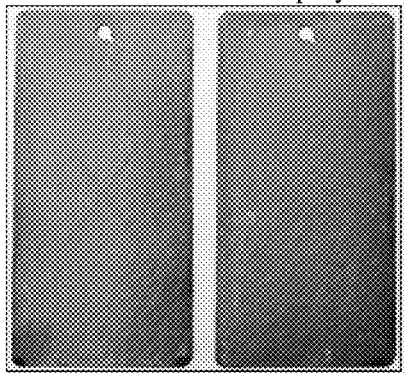
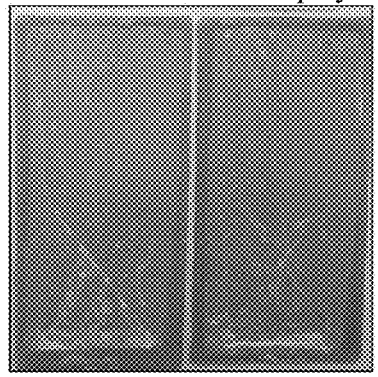
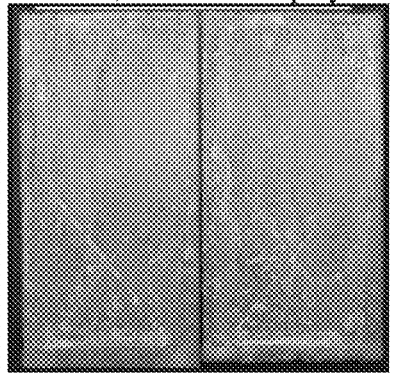
Fig. 2 (a) Nano-sized $SiO_2$
After 96 hrs in Salt Spray
Fig. 2 (b) Nano-sized $Al_2O_3$
After 430 hrs in Salt Spray
Fig. 2 (c) Tytan AQ230
After 48 hrs in Salt Spray
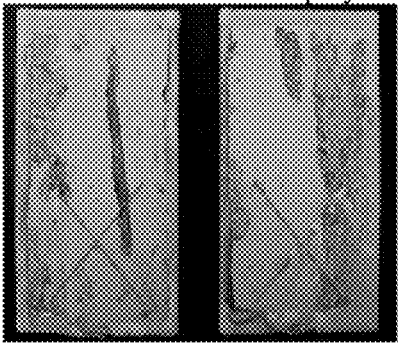
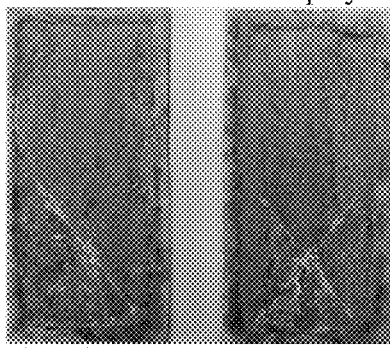
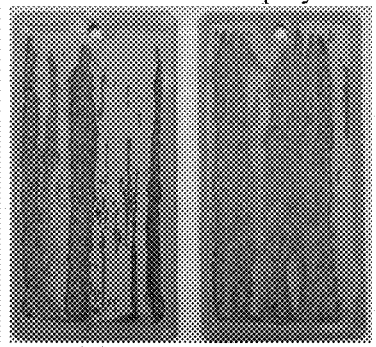
Fig. 2(d) JEFFSOL®GC
After Boiling H2O test
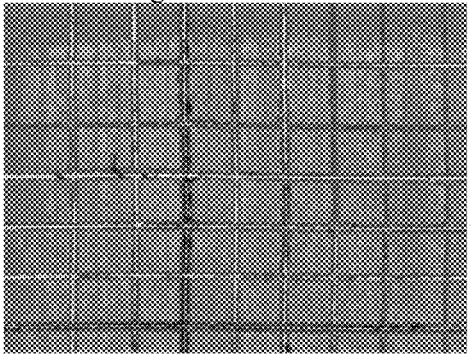

Fig. 3(a) 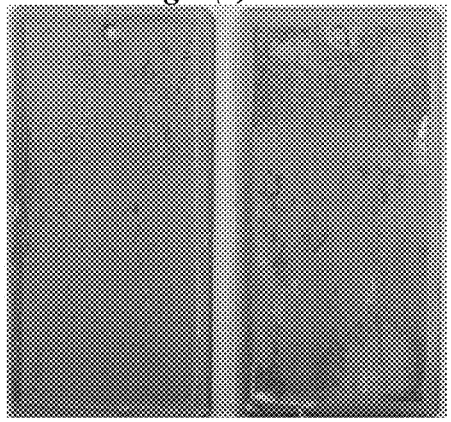 Fig. 3(b) 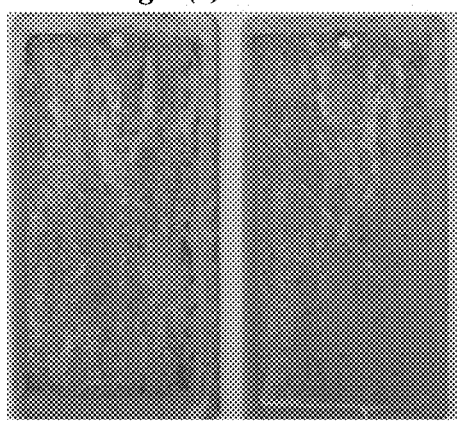
*Fig. 4(a) Baseline: Coating cured at 650 degrees F / 30 min, no nano Ce oxide cure accelerator*
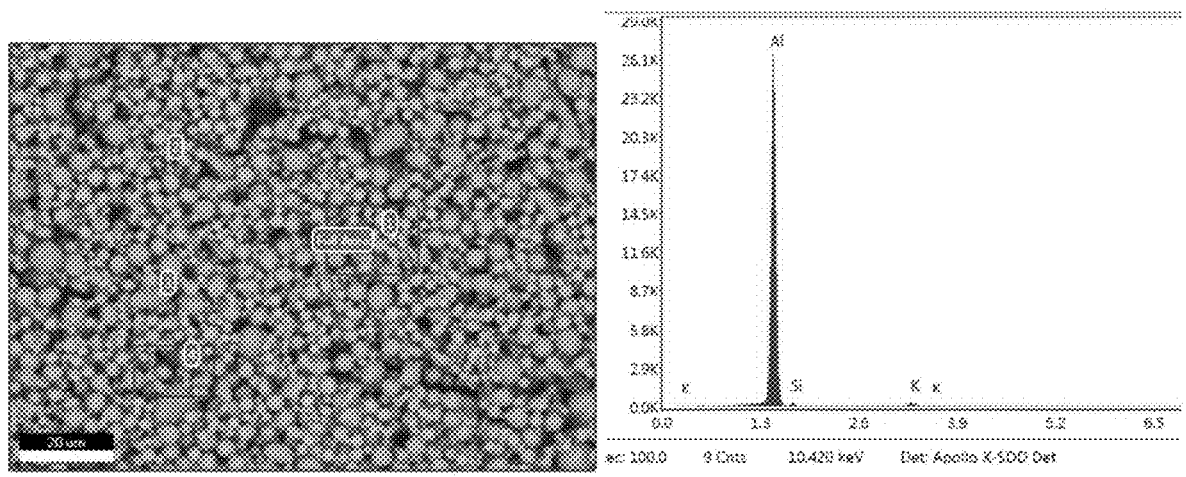

*Fig. 4(b) Coating cured at 450 F degrees / 2 hrs: applied from the same slurry, but with addition of Ce oxide cure accelerator*
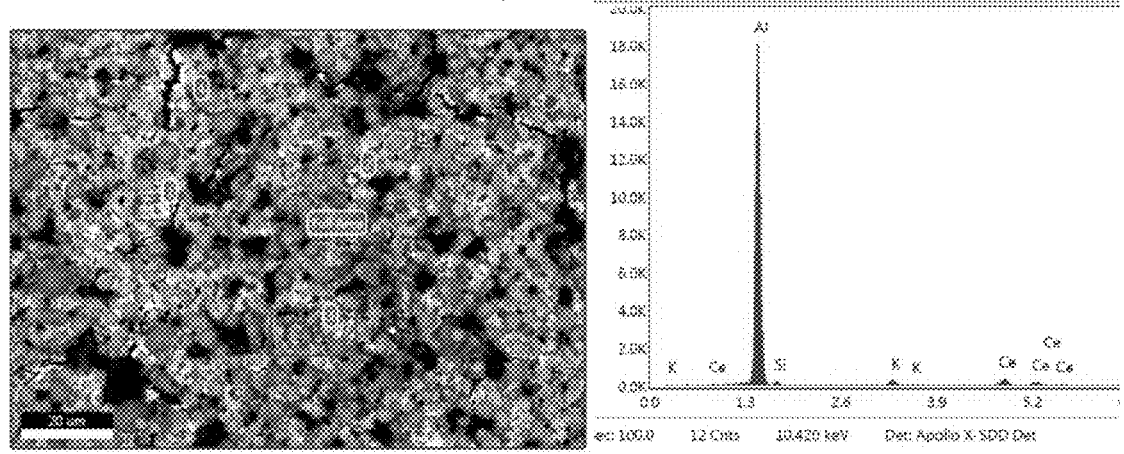
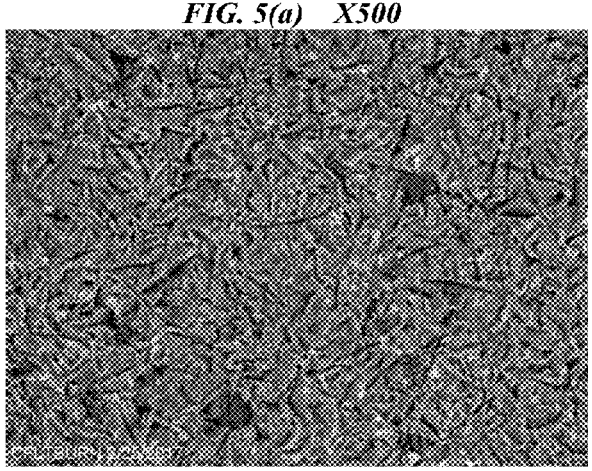
*FIG. 5(a)   X500*
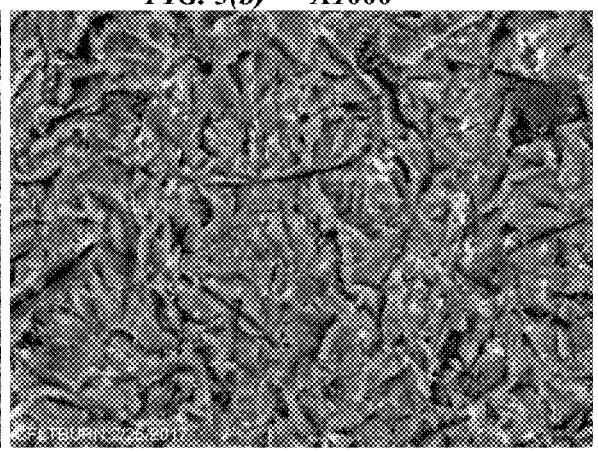
*FIG. 5(b)   X1000*

*FIG. 6 (a) before burnish X1000*
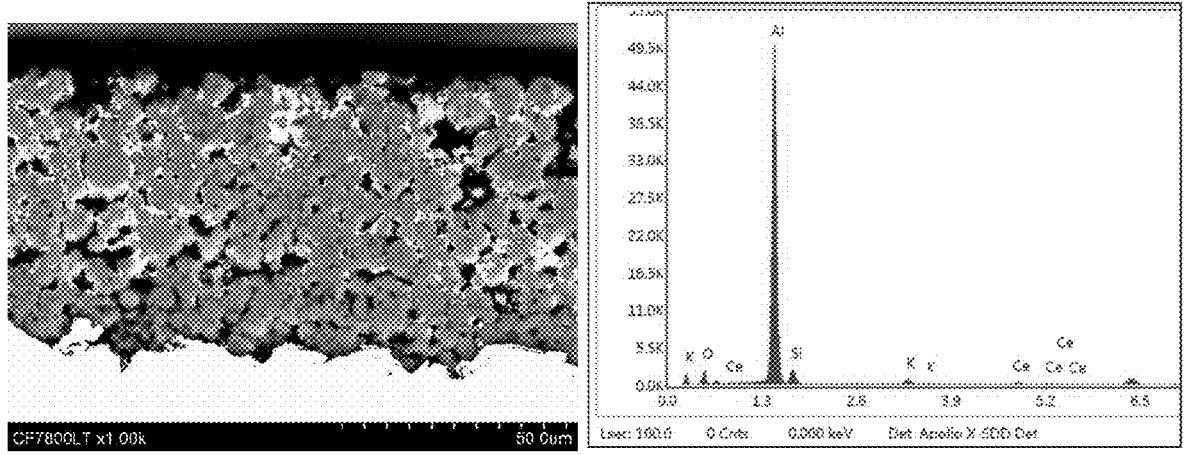
*FIG. 6 (b) after burnish X2000*
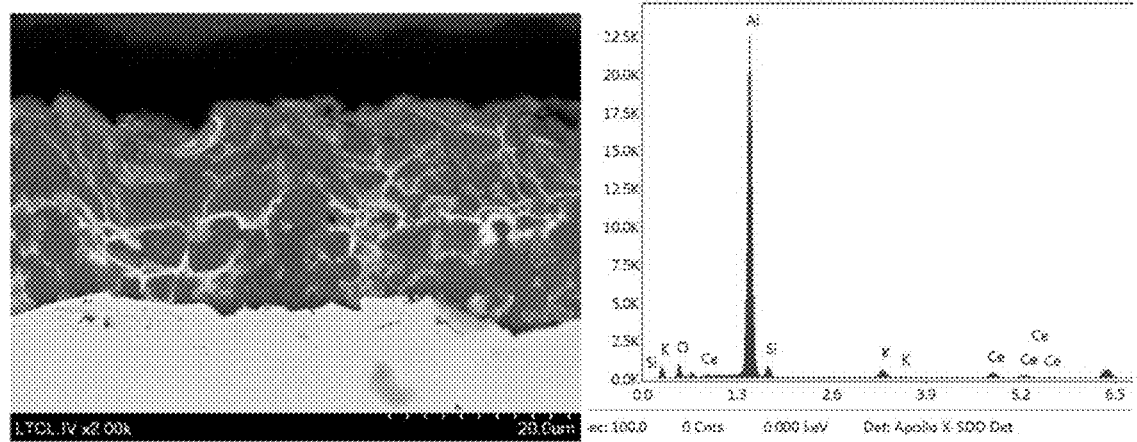

*Fig. 7 Cross-section view SEM images with EDS spectra of Li-doped K Silicate based coatings cured at 450 degrees F / 2 hours with addition of Ce oxide cure accelerator: only the first coating layer is burnished with $Al_2O_3$ media*
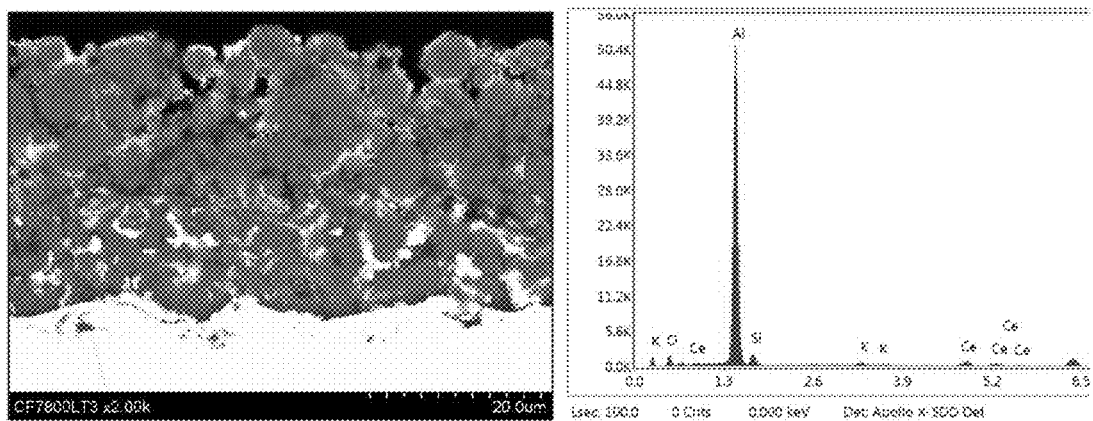
*Fig. 8a*  *Fig. 8b*  *Fig. 8c*  *Fig. 8d*
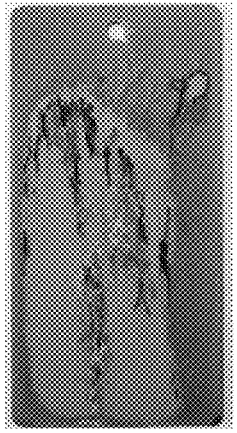 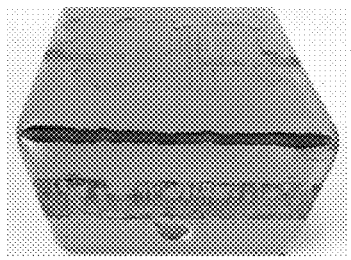 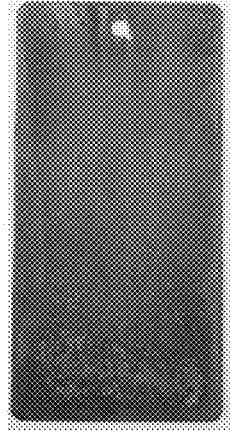 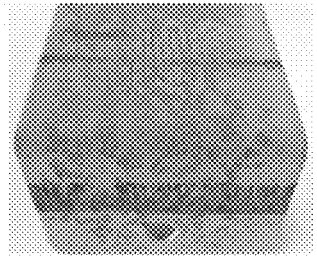

*Fig. 9a* *Fig. 9b*
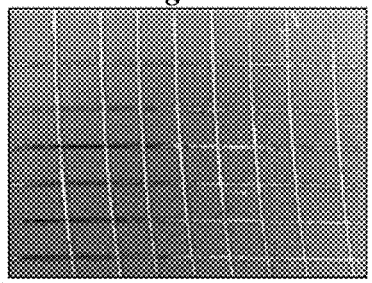 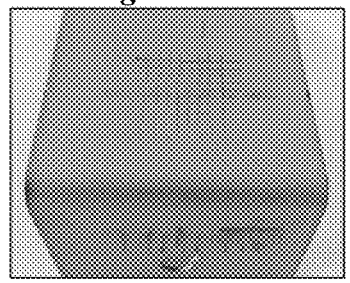
*Fig. 10(a)* *Fig. 10(b)* *Fig. 10(c)* *Fig. 10(d)*
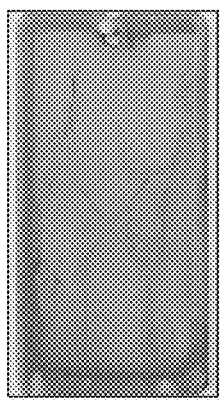 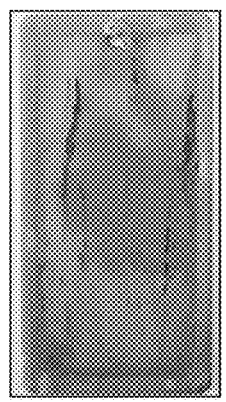 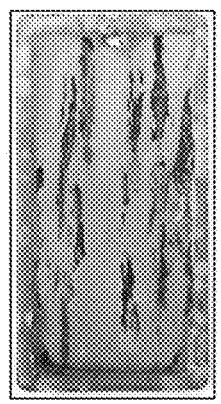 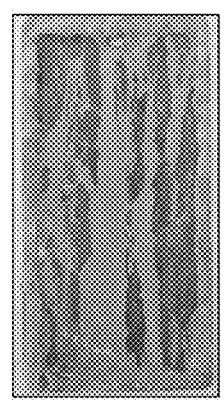
*Fig. 11(a)* *Fig. 11(b)* *Fig. 11(c)*
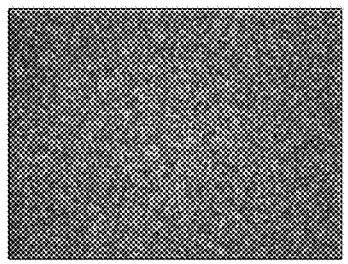 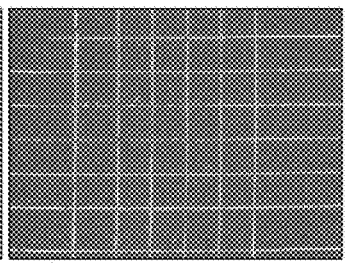 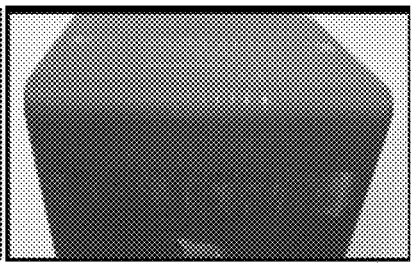

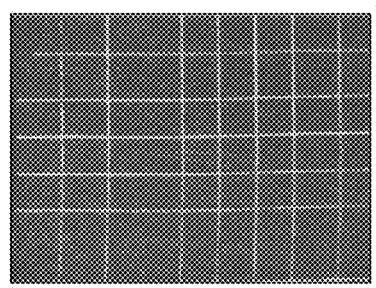 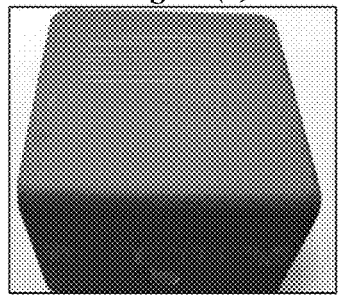
*Fig. 15(a)* *Fig. 15(b)*
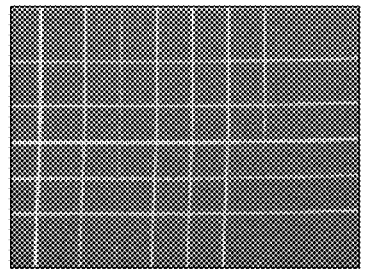 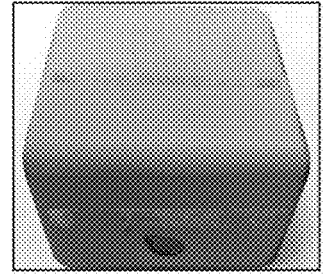
*Fig. 16(a)* *Fig. 16(b)*

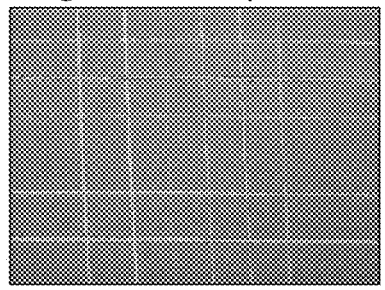
Fig. 17(a): Slurry A
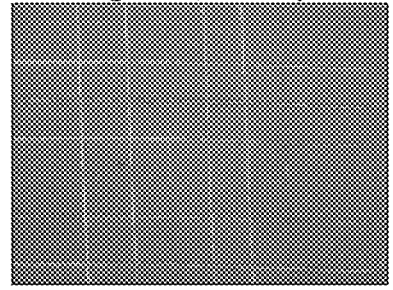
Fig. 17(b): Slurry B
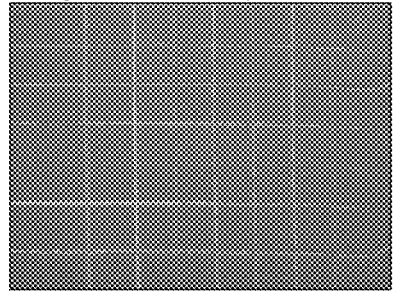
Fig. 17(c): Slurry C
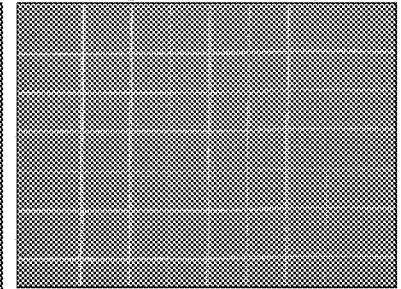
Fig. 17(d): Slurry D

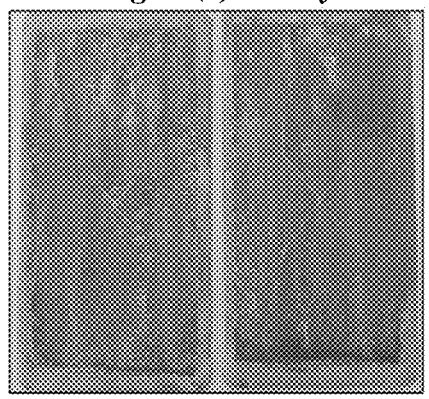
Fig. 18(a): Slurry A
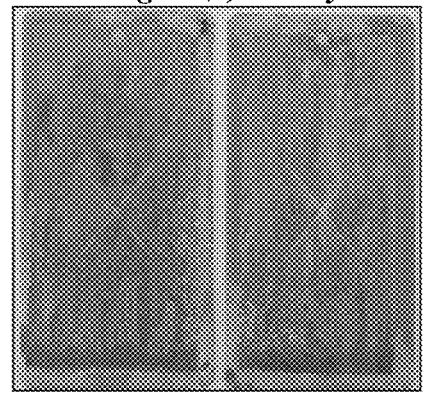
Fig. 18(b): Slurry B
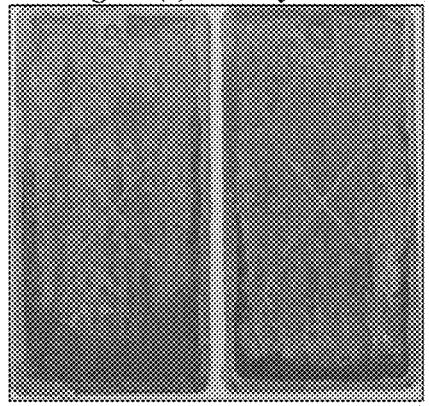
Fig. 18(c): Slurry C
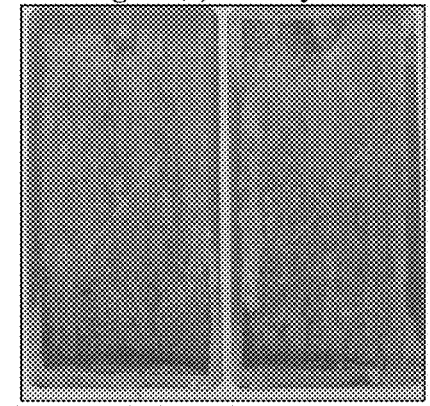
Fig. 18(d): Slurry D

*Fig. 19(a): 336 hours* 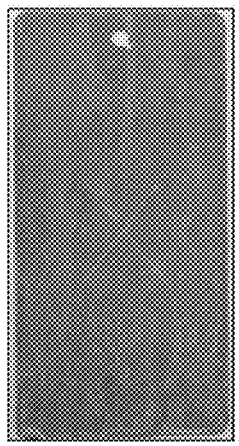
*Fig. 19(b): 568 hours* 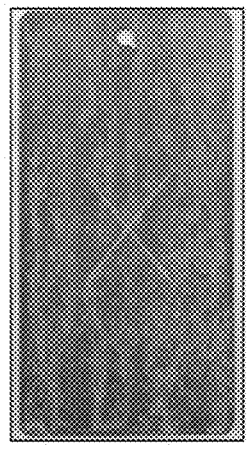
*Fig. 19(c): 1,154 hours* 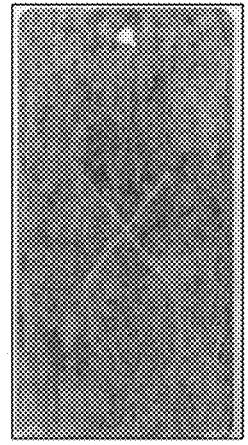
*Fig. 19(d): 1,470 hours* 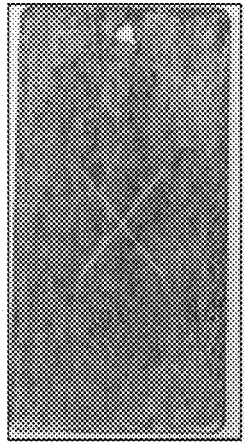
*Fig. 19(e): 1,753 hours* 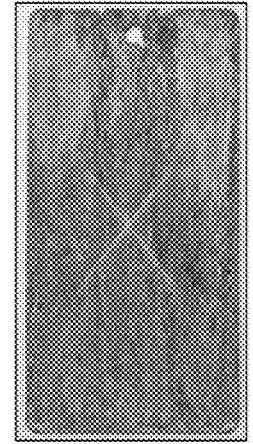
*Fig. 19(f): 2,550 hours* 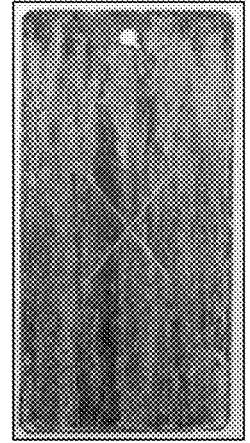

CHROMIUM-FREE SILICATE-BASED CERAMIC COMPOSITIONS WITH REDUCED CURING TEMPERATURE

FIELD OF THE INVENTION

The present invention relates to novel silicate-based slurry formulations which are chromium-free and methods that are suitable in the production of novel protective coatings exhibiting superior corrosion and heat resistance and capable of replacing traditional chromate-containing coatings. The coatings of the present invention are capable of achieving a full cure at temperatures as low as 350-450 degrees F., thus making the coatings especially suitable for application on temperature sensitive base materials, such as ultrahigh strength steels, titanium and aluminum alloys.

BACKGROUND OF THE INVENTION

Chromium-based aluminum-ceramic coating compositions have been well known and considered for decades as the industry standard for forming coatings which are highly corrosion-resistant and heat-resistant. U.S. Pat. No. 3,248,251 to Allen ("Allen patent") issued over forty years ago and recognizes and describes the ability of aluminum-ceramic chromium-based coatings to exhibit resistance to corrosion, heat and abrasion while retaining adhesion and flexibility. Such attributes have continued to make aluminum-ceramic coatings widely used in a variety of applications. Today, these coatings are relied upon by original equipment manufacturers (OEM's) in the aircraft industry for protection of various aircraft engine, landing gear and other components subject to high temperature and corrosive environments. Department of Defense (DoD) depot facilities also use aluminum-ceramic coatings as part of their manufacturing for critically needed items. Additionally, the industrial power generation, automotive and various other industries routinely use aluminum-ceramic coatings as a high performance protective coating.

The conventional aluminum-ceramic coating consists of a chromate-phosphate binder that is filled with metallic aluminum powder. Upon curing, the binder forms a matrix that is embedded with the aluminum powder particles. The matrix provides mechanical integrity to the coating, while the chromate passivated aluminum pigment network imparts efficient corrosion protection. Burnishing Al-filled coating by dry grit or glass bead-blasting compresses the coating to render it conductive, galvanically active and sacrificial (i.e., cathodically protective) to all steels. SermeTel W® is generally recognized in the industry as the performance standard for these types of coatings. Depending on the particular application and service conditions, the coating can be used alone to provide adequate corrosion protection. Alternatively, the coating can be utilized as a part of an overlay system, serving as a basecoat that is sealed with top coatings and/or sealers.

In order to achieve an optimal performance of aluminum-ceramic coatings, it is recommended to cure the coatings at temperatures not lower than 500 F, and preferably at 600 F-650 F. The coatings that are not fully cured tend to show deficiencies in the functional performance, such as generally unsatisfactory adhesion to a substrate and generally unsatisfactory interlayer adhesion, reduced corrosion resistance, coating blistering in humid and corrosive environment, etc.

However, in some cases, there are temperature processing limitations, mostly imposed by a chemical nature and/or a type of a material of the substrate being utilized, that prevents coatings from being fully cured at the relatively higher cure temperature to form a coating that can meet applicable criteria. Examples include components composed of materials that cannot be exposed to the normal cure temperatures required for SermeTel® coatings. Lower cure temperatures are required for many high-strength steels, titanium alloys and heat-treated aluminum alloys in a variety of applications to preserve mechanical properties and avoid damage and degradation of functional properties of such temperature-sensitive base materials.

Ultra-high strength martensitic steels are well-known for having cure temperature limitations imposed by the steel heat treatment process, mostly by a tempering regime used for these steels to achieve a required combination of mechanical properties that are optimum for their intended part service conditions. Tempering is a heat treatment technique applied to ferrous alloys to achieve greater toughness by decreasing the hardness of the alloy. The reduction in hardness is usually accompanied by an increase in ductility, thereby decreasing the brittleness of the metal. For these alloys, a lower tempering temperature will produce a harder and higher tensile strength part; however, this will reduce ductility, impact strength, create a service temperature limit and possibly also lower fatigue life.

It is known that the heat treatment process for achieving optimum tensile, toughness and fatigue characteristics of ultra-high strength, low alloy steels consists of quenching in the range of 845-900 C and tempering in the range of about 200-300 C, with the exact temperatures depending on the chemical composition of the alloy. In particular, for 299M high strength steel that is preferentially used in aircraft landing gear, airframe parts and other components serving under extreme loading conditions, a tempering temperature of about 300 degrees C. (i.e., about 570 degrees F.) is recommended; for example, tempering this alloy at 310 degrees C. (i.e., 590 degrees F.) gives a nominal Rockwell Hardness of 55 HRC (as described in "Ultrahigh strength steels for aerospace applications" by W. M. Garrison, JOM, v. 42, 1990, pp. 20-25, and as described in "Influence of tempering temperature on mechanical properties of ultra-high strength low-alloy steels" by J. Hornikova et. al. at www.phase-trans.msm.cam.ac.uk, 2005).

However, the tempering temperature used on the substrate material puts a strict limitation on the heat exposure tolerance of the alloy: to preserve optimal mechanical properties achieved through tempering, the tempering temperature cannot be exceeded. Thus, any further processing, such as application and curing of protective coatings on the components made of 300M should be performed at temperatures safely below 300-310 degrees C. (i.e., 570-590 degrees F.). OEM specifications require curing SermeTel® coatings applied onto 300 M components at 275-288 degrees C. (i.e., 525-550 degrees F.). For other ultra-high strength steels, tempering temperatures can be as low as 200-240 degrees C. (i.e., 390-460 degrees F.), thus limiting heat exposure tolerance to about 350-450 degrees F.

Aluminum alloy components represent another case of cure temperature limitations imposed by the temperature tolerance of the base material. Aerospace aluminum alloys used in aircraft parts (e.g., such as lipskins of nacelles for jet engines, leading edges of wings and tails, etc.) generally contain copper, which provides strength when heat treated. However, even AA2219, which is an aluminium-copper alloy, is considered heat tolerant and will lose strength and distort at temperatures higher than 232 degrees C. (i.e., 450 degrees F.). Thus, any coating systems applied for environmental protection of aircraft parts made of such an aluminium-copper alloy, should be capable of undergoing a full cure below 450 degrees F.

It is known in the field that the addition of certain chemical additive compounds to the chromate-phosphate based Al-containing coating slurries results in lower cure temperatures that can achieve a full cure of the protective coatings derived from these slurries. There are several patents, some of which were granted as early as 1966, that describe employment of various additive compounds for this purpose.

U.S. Pat. No. 3,248,249 to Collins, Jr. discloses that the curing temperature of the chromate-phosphate based coating composition described in the aforementioned Allen patent can be reduced by 250-500 degrees F. by addition of a solid particulate material having a particle size of 0.1 micron or finer, such as colloidal silica or colloidal alumina particles.

Another U.S. Pat. No. 3,248,250 to Collins, Jr. discloses that the curing temperature of the chromate-phosphate based coating composition can be lowered by adding an alkali metal silicate to this composition.

As described and claimed by Collins, Jr. and Klotz, J. M. in U.S. Pat. No. 4,319,924, the addition of diethanoloamine in the acidic aqueous coating slurry composition containing dissolved phosphate, dissolved dichromate, dissolved aluminium and inorganic solid particulate material, makes its aqueous coating composition capable of being heat-cured into a water insoluble coating at temperatures within the range of about 180 degrees F. to about 225 degrees F.; the cured coating exhibits acceptable adhesion to steel and acceptable corrosion resistant properties.

Also, U.S. Pat. No. 4,381,323 to Lowe, J. C. et al., describes employing diethanolamine as a cure temperature reduction component for the chromate-phosphate based aluminium ceramic slurry coatings.

The commercial SermeTel®984/985 coating system was developed and has been employed by several OEMs to provide galvanic, sacrificial corrosion protection for components composed of materials that cannot be exposed to the normal cure temperatures for SermeTel® coatings. The base coat layer in this system is also a chromate-phosphate based aluminium ceramic composition that employs a cure accelerator from a class of quaternary ammonium hydroxides; the cure accelerator provides reduction of the full cure temperature to a minimum of 335 degrees F. (168 degrees C.). This corrosion-protective coating system has been successfully employed in the field for a relatively long time for many high-strength steels, titanium and heat-treated aluminium alloys in a variety of applications.

ShorCoat™ coating system is another commercially available corrosion and erosion resistant coating that employs a SermeTel® aluminium cermet basecoat with a reduced cure temperature; this basecoat is employed in combination with an aluminium-silicone paint topcoat. This coating system has been developed to protect aluminium alloy lipskins and other nacelle components that operate in a corrosive, erosive and aircraft de-icing conditions (i.e., cyclic heat). Corresponding U.S. Pat. No. 6,171,704 to Mosser M. F., et. al. discloses this coating system.

Notwithstanding all the developmental efforts and long-standing history of employing aluminum-ceramic coatings with reduced cure temperatures, the major shortcoming of these coatings is that the coating slurries contain hexavalent chromium Cr (VI). Hexavalent chromium Cr (VI) has been identified as an environmentally hazardous material of concern. Consequently, it has been targeted for elimination in accordance with recent changes in the EU REACH regulations, as well as the respective policies of the DoD, Air Force and various OEM's.

In response to the identification of hexavalent chromium Cr(VI) as an environmentally hazardous material, various Cr-free coatings have been investigated as potential replacement coatings. However, the development of Cr (VI)-free alternatives has focused mostly on the aluminum-ceramic coatings with a cure temperature of higher that 500 F, and preferably 600-650 F.

For instance, one alternative Cr-free coating disclosed in U.S. Pat. No. 7,993,438 to Mosser et al. is an aluminum ceramic basecoat layer having a phosphate-based binder composition. The coating when employed in conjunction with a Cr (VI)-free top coating, provides application properties (e.g., thickness, roughness, galvanic activity) and performance (e.g., salt spray corrosion resistance, high temperature heat oxidation resistance, erosion resistance, mechanical properties) comparable to the benchmark coating systems with SermeTel W® basecoats. However, when used as stand-alone basecoats, these coatings develop a red rust in the scribe and the field when subject to testing of up to 1000 hours in the Salt Spray test per ASTM B117. Another drawback of this approach stems from a significant interaction of aluminum particles with the phosphate binder in a water-based slurry in the absence of Cr (VI) species that have a passivating effect on aluminum metal. As a result of this adverse interaction, the basecoat slurry cannot be maintained as a "one-part" composition, in which all of the constituents can be mixed together into a single formulation. Rather, the slurry must be maintained in storage as a two-part slurry, in which the aluminum powder is maintained separate from the aqueous binder, until the point of use when the binder and Al can be mixed. However, the pot life of the mixed slurry is only about 8-20 hours, beyond which a rapid deterioration of the mixture is observed, and that manifests itself in agglomeration of Al particles leading to a significant increase in the particle size. Thus, to avoid the adverse interaction of the aluminum particles with the phosphate binder, the slurries disclosed in U.S. Pat. No. 7,993,438 must undesirably remain a two-part composition that is intended to be mixed together immediately before the coating application and used in a short period of time. These limitations are a significant disadvantage in a production type environment.

As another alternative, aluminum ceramic coatings with silicate-based binders have been considered. One type of Cr-free, silicate-based binder is generally described in US Patent Published Application No. 2006/0166014 to Klotz et al. However, basecoat performance is dependent upon layer thickness, with increased coating thicknesses to at least 2 mils being required for sufficient corrosion resistant properties.

A need for improved one-part Cr-free coatings which can provide advantageous mechanical and functional properties, including corrosion and heat resistance, has been successfully addressed by the inventions disclosed in U.S. Pat. Nos. 9,017,464; 9,322,101; and 9,394,448 to Belov, I. et. al. ("Belov patents"), each of which are hereby incorporated by reference in their entirety, respectively. The inventions disclosed in each of the Belov patents relate, in part, to a slurry formulation that is used to produce coatings with superior functional properties that are particularly advantageous for aerospace applications, but not limited thereto.

The disclosed slurry formulation in the Belov patents employs a chromium-free, lithium-doped potassium silicate binder in combination with an aluminum powder. The aluminum or aluminum alloy powder and the binder are contained as a one-part composition, in which all constituents are pre-mixed in a predetermined weight ratio into a single formulation. The one-part composition remains sufficiently stable to exhibit relatively long shelf-life in comparison to the prior art alternatives. When applied to a substrate in accordance with the process disclosed in the Belov patents, the slurry produces a ceramic coating layer that is continuous, dense and defect-free, with the resultant composition comprising a Cr(VI)-free ceramic matrix formed by a lithium doped, potassium silicate-binder and a plurality of aluminum particles embedded within the matrix. The ceramic coating exhibits improved functional properties, and, in particular, resistance to corrosion and heat exposure while retaining adhesion and flexibility.

However, a method for applying the disclosed coatings in the Belov patents onto a substrate, as described in U.S. Pat. No. 9,322,101 comprises utilizing cure temperatures of higher that 500 degrees F., preferably 600-650 degrees F., that should be employed to produce fully cured Cr (VI)-free coatings from the aforementioned slurries. When these coatings are cured at reduced temperatures, it has been observed by Applicants, as will be demonstrated in greater detail below, that an incomplete cure process results in inferior adhesion and functional properties of the coatings, such as insufficient resistance to high humidity, blistering and delamination—under even a relatively short exposure to the Salt Spray test, etc.

Thus, there remains a need for Cr-free high-performance coatings that can exhibit properties at least the same as that of the aluminum-ceramic coatings with Cr-based binders, but which can be fully cured at temperatures below 500 degrees F.

SUMMARY OF THE INVENTION

The invention relates, in part, to a slurry formulation used to produce coatings with special properties. The coatings of the present inventions are hexavalent chromium free aluminum-ceramic matrix composites derived from silicate based binders and can achieve a full cure at the temperatures below 500 degrees F., resulting in a coated product that is particularly advantageous for aerospace parts made of the materials with limitations for heat exposure temperatures.

It has been found that utilizing an addition of nano-sized cerium oxide in the form of its colloidal solution as a cure catalyst allows to fully cure a ceramic coating that is derived from the slurries. The slurries comprise a chromium-free lithium-doped potassium silicate binder in combination with an aluminum powder at reduced temperatures of below 500 degrees F.; the invented slurry composition produces a ceramic coating exhibiting improved functional properties when cured at 350-450 degrees F., in particular resistance to corrosion and high humidity while retaining adhesion and flexibility. The coating layer is continuous, dense and defect-free.

In a first aspect, an aqueous slurry composition for the production of a coating on a substrate comprising: a binder comprising an aqueous solution of lithium doped, potassium silicate, the binder characterized by an absence of chromium; an aluminum powder or an aluminum alloy powder incorporated into the binder; and a cure catalyst comprising nano-sized cerium oxide colloidal solution.

In a second aspect, an aqueous slurry composition for the production of a coating on a substrate comprising: a binder comprising an aqueous solution of lithium doped potassium silicate, the binder characterized by an absence of chromium; a zinc powder in combination with an aluminum or an aluminum alloy powder; and a cure catalyst accelerator comprising a nano-sized cerium oxide colloidal solution.

In a third aspect, a coating composition for a substrate comprising: a ceramic matrix not containing chromium, said matrix formed by a silicate binder, wherein said silicate binder is a potassium silicate doped with lithium; a plurality of aluminum-containing particles embedded within said matrix; and a cerium-containing compound, said cerium-containing compound impregnated into the ceramic matrix as a cerium-containing phase.

In a fourth aspect, a coating composition for a substrate comprising: a ceramic matrix not containing chromium, said matrix formed by a silicate binder, wherein said silicate binder is potassium silicate doped with lithium; a plurality of aluminum-containing and zinc-containing particles embedded within said matrix; and a cerium-containing compound, said cerium-containing compound impregnated into the ceramic matrix as a cerium-containing phase.

In a fifth aspect, a method for applying a coating onto a substrate comprising: providing an aqueous one-part slurry comprising: a lithium doped potassium silicate binder, the binder characterized by an absence of chromium; and an aluminum-containing powder incorporated into the binder in a predetermined weight ratio of the binder to the aluminum-containing powder; applying the aqueous one-part slurry onto a surface of the substrate; treating the applied layer of the aqueous one-part slurry with a colloidal solution of a nano-sized cerium oxide to form a basecoat layer; and curing the basecoat layer.

In a sixth aspect, a method for applying a coating onto a substrate comprising: providing an aqueous one-part slurry comprising: a lithium doped potassium silicate binder, the binder characterized by an absence of chromium; and an aluminum-containing powder incorporated into the binder in a predetermined weight ratio of the binder to the aluminum-containing powder; and a zinc-containing powder incorporated into the binder in a predetermined weight ratio of the aluminum containing powder to the zinc-containing powder; applying the aqueous one-part slurry onto a surface of the substrate; treating the applied layer of the aqueous one-part slurry with a colloidal solution of a nano-sized cerium oxide to form a basecoat layer; and curing the basecoat layer.

In a seventh aspect, a method for applying a coating onto a substrate comprising: providing an aqueous one-part slurry comprising: a lithium doped potassium silicate binder, the binder characterized by an absence of chromium, and an aluminum-containing powder, said aluminum-containing powder incorporated into the binder in a predetermined weight ratio of the binder to the aluminum-containing powder; introducing a colloidal solution of a nano-sized cerium oxide into the aqueous one-part slurry to form a mixture; and applying the mixture onto a surface of the substrate to form a basecoat layer; and curing the basecoat layer.

BRIEF DESCRIPTION OF THE DRAWINGS

The specification contains at least one photograph executed in color. Copies of this patent or patent publication with color photograph(s) will be provided by the Office upon request and payment of the necessary fee.

The objectives and advantages of the invention will be better understood from the following detailed description of the preferred embodiments thereof in connection with the accompanying figures wherein like numbers denote same features throughout and wherein:

FIGS. 1(a) and 1(b) show comparison of the Salt Spray performance of the coating composition disclosed in U.S. Pat. No. 9,017,464 that was cured at 450 degrees F. for 2 hours and 650 degrees F. for 0.5 hour, respectively.

FIGS. 2(a) through 2(d) demonstrate negative results for lithium-doped potassium silicate-based binders of U.S. Pat. No. 9,017,464 with different cure accelerators known as silicate cure catalysts, each of which was cured at 450 degrees F. for 2 hours.

FIGS. 3(a) and 3(b) present positive corrosion resistance test results as observed after 480 hours (a) and 1,720 hours (b), respectively, for a Salt Spray exposure of Li-doped Potassium Silicate binder-based coating with addition of a colloidal nano ceria cure accelerator that was cured at 450 degrees F./2 hours, in accordance with the present invention.

FIG. 4(a) presents data for the baseline coating that does not employ a Ce oxide cure accelerator, and which is cured at 650 degrees F. for 30 minutes, in comparison with FIG. 4(b) that shows data for the coating of the present invention that comprises Ce oxide cure accelerator and is cured at 450 degrees F. for 2 hours.

FIGS. 5(a) and 5(b) show top view SEM images at a magnification of ×500 and ×1000, respectively, of the coating sample of the present invention that comprises Ce oxide cure accelerator and is cured at 450 degrees F. for 2 hours, after this coating has been burnished with aluminum oxide grit (220 mesh size grade);

FIGS. 6 (a) and 6 (b) show cross-section SEM images with EDS analysis data at a magnification of ×1000 of the coating sample of the present invention that comprises Ce oxide cure accelerator and is cured at 450 degrees F. for 2 hours, before (a) and after (b) it has been burnished with aluminum oxide grit (220 mesh size grade).

FIG. 7 shows a cross-section SEM image with EDS analysis data at a magnification of ×2000 of a Li-doped Potassium silicate-based coating of the present invention that comprises Ce oxide cure accelerator and is cured at 450 degrees F. for 2 hours, after only the first coating layer has been burnished with aluminum oxide grit (220 mesh size grade).

FIGS. 8(a), 8(b), 8(c) and 8(d) demonstrate that neither a colloidal solution of nano-sized titanium dioxide, nor a solution of Ce nitrate can accelerate the cure of Li-doped Potassium Silicate binder-based coatings, as a result of the coatings having been cured at 450 degrees F. and not possessing resistance to the Salt Spray and boiling water.

FIGS. 9 (a) and 9 (b) demonstrate results of cross-hatch and bend adhesion tests performed on a Li-doped Potassium silicate binder based coating of Example 1 of the present invention treated with the addition of colloidal nanoceria cure accelerator and cured at 450 degrees F. for 2 hours.

FIGS. 10 (a), 10 (b), 10 (c), 10(d) show the coating of Example 2 of the present invention that was exposed to the Salt Spray test for up to 1720 hours.

FIGS. 11 (a), 11(b) and 11(c) demonstrate morphology, cross-hatch and bend adhesion tests, respectively, performed on the coating of Example 1 of the present invention after its exposure to Boiling water.

FIGS. 15 (a) and 15 (b) show results of cross-hatch and bend adhesion tests performed on the coating of Example 1 of the present invention after its immersion in the engine Fuel B test fluid.

FIGS. 16 (a) and 16 (b) show results of cross-hatch and bend adhesion tests performed on the coating of Example 2 of the present invention after its immersion in the engine Fuel B test fluid.

FIGS. 17(a), 17(b), 17(c) 17(d) show results of cross-hatch adhesion of the coatings of Example 4 of the present invention after performing boiling water tests.

FIGS. 18(a), 18(b), 18(c), 18(d) show results of the coatings of Example 4 of the present invention after their Salt Spray exposure to 1100 hours.

FIGS. 19(a), 19(b), 19(c), 19(d), 19(e) and 19(f) show a coating that was produced from Slurry C of the present invention at different exposure times to Salt Fog.

DETAILED DESCRIPTION OF THE INVENTION

Figure 12A:
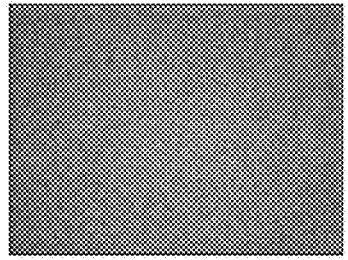
FIGS. 12 (a), 12 (b) and 12 (c) demonstrate morphology, cross-hatch and bend adhesion tests performed on the coating of inventive Example 2 after its exposure to Boiling water.

The relationship and functioning of the various elements of this invention are better understood by the following detailed description. However, the embodiments of this invention as described below are by way of example only.

The detailed description contemplates the features, aspects and embodiments in various permutations and combinations, as being within the scope of the disclosure. The disclosure may therefore be specified as comprising, consisting of or consisting essentially of, any of such combinations and permutations of these specific features, aspects, and embodiments, or a selected one or ones thereof.

Throughout this disclosure, various aspects of the invention can be presented in range format. It should be understood that the description in range format is merely for convenience and brevity and should not be considered as a limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

An aqueous slurry composition of the present invention can be used to apply a protective coating onto various solid substrates, including, by way of example, ferrous alloys, nickel alloys, nickel-cobalt alloys, and other metallic (such as aluminum alloys, cobalt alloys, etc.) and nonmetallic thermally stable surfaces (such as ceramics). While metal substrates are preferred, any solid substrate may be suitable for the application of the coating of the present invention, provided that the solid substrate is capable of withstanding corresponding coating processing temperatures.

An aqueous slurry composition for production of a coating in accordance with one aspect of the present invention comprises a silicate binder and aluminum, aluminum alloy or combination of aluminum and zinc powders incorporated into the binder in a predetermined weight ratio. The silicate binder does not contain Cr and therefore is an environmentally safe material. The silicate Cr-free binder is an aqueous solution of lithium-doped potassium silicate. "Lithium-doped potassium silicate" as used herein means that predetermined amounts of lithium ions displace potassium ions in the silicate structure, as well as in the cured silicate matrix. The slurry composition is utilized in combination with a colloidal solution of nano-sized cerium oxide.

It has been surprisingly discovered in the present invention that utilizing an addition of nano-sized cerium oxide in the form of its colloidal solution as a cure catalyst allows fully curing a ceramic coating that is derived from slurries at reduced temperatures of below 500 degrees F.; the inventive slurry composition produces a ceramic coating exhibiting improved functional properties when cured at 350-450 degrees F. The improved functional properties include resistance to corrosion and high humidity while retaining adhesion and flexibility. The coating layer is continuous, dense and defect-free.

As disclosed in U.S. Pat. Nos. 9,017,464 and 9,322,101, employing a lithium-doped potassium silicate-based binder with aluminum powder incorporated therein provides a synergistic effect of improvements in functional properties (e.g., corrosion resistance, corrosion-heat resistance) as well as structural and adhesion properties of the coatings, in comparison to other silicate-based binders. However, temperatures of higher that 500 degrees F., preferably 600-650 degrees F. is required to be employed to produce fully cured Cr (VI)-free coatings: FIG. 1 shows a comparison of these coatings under Salt Spray exposure per ASTM B117 test (hereinafter, referred to as "Salt Spray"); the composition of the coating shown in FIG. 1 was in accordance with the preferred embodiment of the aforementioned Belov patents. While the coating cured at 650 degrees F. can withstand more than 1,000 hours of corrosive and humid testing environment, the same coating cured at 450 degrees F. develops blisters only after 24 hours. The data clearly demonstrates that a complete cure of said coatings was not achieved at the reduced temperature of 450 degrees F., even at significantly longer cure times, thus resulting in insufficient resistance in the humid, chloride-containing environment of the Salt Spray cabinet, i.e. developing blistering and delamination under even very short exposure times.

It is well known in the art that conversion of silicate-based binders in the solid, continuous films with acceptable bonding to a substrate and resistance to moisture takes place when the cure process is fully completed and irreversible. An incomplete cure process is disadvantageous because it leads to moisture pick up, thereby resulting in degradation of the coating properties.

Curing of a silicate (e.g., alkali silicate) is a co-occurrence of physical and chemical processes and proceeds as a two-step process that can be described as follows: in the first step, evaporation of non-chemically bonded water takes place, resulting in the formation of a continuous layer. The surface of this layer becomes dry on touch after losing physically bonded water but remains sensitive to moisture and prone to rewetting when exposed to higher humidity. In the second step, a complete neutralization & polymerization of the alkali silicate binder takes place that forms continuous polymeric siloxane chains (—Si—O—Si—), thus achieving a full cure of the binder and making a silicate-based matrix impermeable to moisture.

The second step of the transition can be achieved through heat treatment and/or by a chemical reaction with cure accelerating compounds. At present, a variety of different cure accelerating agents for silicates are proposed and used; the cure accelerating agents employed in the art belong to different classes of inorganic and organic compounds. A detailed review of different classes of curing accelerating agents of silicates and their reaction mechanisms has been provided by Voitovich V. A. in Polymer Science, Series D, 2010, vol. 3, No. 3, pp. 174-176, 2010.

For example, liquid alkali silicates can be reacted with a variety of acidic or soluble metal compounds that neutralize an alkali silicate, thus polymerizing the silica. Cure catalysts of this group include mineral and organic acids that are stronger than silicic acid (e.g., including carbonic, boric, phosphoric, sulfuric, and acetic acid), inorganic salts, such as inorganic phosphates (e.g., $NaH_2PO_4$, $AlPO_4$, polyphosphates) and aluminates.

Metal oxides (e.g., such as calcium oxide, magnesium oxide, zinc oxide) constitute another group of widely used cure accelerating compounds for alkali silicates, among them, ZnO being the most utilized in alkali silicate-based paints, because it also acts as a white pigment.

Employment of micro- and nano-sized silica as a curing accelerating agent is also well known in the art. For example, as described by Bahri, et. al (in Surface & Coatings Technology, v. 254, 2014, pp. 305-312), the addition of colloidal nano-silica in potassium silicate coatings on AA2024 aluminum alloy improves continuity and uniformity of the formed layers, thus improving corrosion resistance of the coating.

Also, organosilicanates (e.g., such as sodium methyl siliconate) as accelerators for lithium polysilicates cure are disclosed in U.S. Pat. No. 3,549,395 to Sears G. W. et. al.

Still another class of silicate cure accelerators is known in the art: alkylene carbonates such as ethylene carbonate, propylene carbonate and butylene carbonate, (hereinafter, referred to as "EC", "PC", and "BC", respectively) are known to enhance the rate of curing of aqueous sodium silicate. As disclosed in U.S. Pat. No. 4,416,694, when sodium silicate is employed as a binder, the rate of the cure reaction is controlled by the type and/or ratio of particular alkylene carbonates. Also, US Patent Published Application No. US 2007/0079731 A1 to Clements et al., discloses a favorable mixture and ratio of different alkylene carbonates to achieve optimal cure conditions. Various alkylene carbonate cure accelerators are available commercially, such as JEFFSOL® Butylene Carbonate, JEFFSOL® Propylene Carbonate and unsubstituted JEFFSOL® Ethylene Carbonate.

In the course of developing coating compositions of the present invention, the Applicants screened and tested a significant number of different curing agent accelerator compounds, including many of the aforementioned, described in the art for their efficacy for reducing cure temperature of lithium-doped potassium silicate-based binders. However, none of these compounds was determined by Applicants to be useful for producing fully cured coatings at cure temperatures below 500 degrees F. FIG. 2 shows the poor Salt Spray results of some of the curing agent accelerators Applicants tested. FIG. 2a shows the addition of nano-sized particles of silica from several commercial sources (such as Cab-O-Sil® from Cabot Corp. and HeucoSil™ CTF from Heubach); FIG. 2b shows the results of utilizing alumina (under the brand name of Aeroxide® Alu C & Alu 130 from Evonic Industries); and FIG. 2c shows the results of utilizing zirconium triethanolamine complex (available under the commercial name of Tytan™ AQZ30) that is known to undergo hydrolysis in aqueous solutions producing hydroxyl zirconium chelate, which is readily cross-link with —OH groups to form strong gels).

Applicants also tested, with no success, the addition of alkanoamines, in particular aminomethyl propanol, that is known to act as a buffering agent, in order to lower pH of the silicate binder close to neutral to promote faster cross-linking and cure of the silicate matrix. However, the observed results were negative; in particular, when the alkanoamine additives were added in various concentrations (ranging from 1.0 wt. % to 3.0 wt. %) in the slurry of lithium-doped potassium silicate binders filled with aluminum particles, and the slurry was applied to a substrate and cured at 450 degrees F. for up to 16 hours, this additive resulted in coatings that blistered and completely delaminated from the substrate after only 48 hours of Salt Spray exposure.

Similarly, the testing of alkene carbonates that are known and widely employed in the art for cure accelerating of alkali silicates was unsuccessful. For example, commercial JEFFSOL®GC propylene carbonate was not efficient for catalyzing the cure of the lithium-doped potassium silicate binder of the present invention: addition of this compound in the slurry of the present invention was found to be detrimental for the interlayer adhesion properties of the coating. As seen in FIG. 2 (d), the coating was chalking after exposure to the boiling water and developed blistering after only 24 hours exposure to the Salt Spray.

After all of the numerous unsuccessful experiments performed by Applicants, Applicants were surprised to discover that a colloidal solution of nano-sized cerium oxide particles did act as an efficient cure accelerator for the coatings produced from the slurry comprising lithium-doped potassium silicate binder filled with aluminum particles, thus allowing a reduction in cure temperature of said coatings below 500 degrees F., such as in a range from 400 degrees F.-450 degrees F. As will be demonstrated further in the Examples, the coatings produced with employment of this cure accelerator demonstrated acceptable adhesion to the substrates and interlayer adhesion, as well as high corrosion resistance for over 1,000 hours of the Salt Spray and high humidity exposure, resistance to boiling water and engine fluids.

As shown in FIG. 3(a) and FIG. 3(b), the coatings of the present invention, when treated with the colloidal solution of nano ceria and cured at 450 degrees F. for two hours, were resistant to corrosion in the Salt Spray environment. Additionally, FIG. 3(b) shows that no blistering, and no red rust were observed after 1,720 hours of Salt Spray exposure.

The slurry compositions of the present invention that employ the aforementioned nano-sized cerium oxide cure accelerator (i.e., cure catalyst) can be applied to a substrate by any number of conventional application techniques known in the art, such as by spraying, brushing, dipping, dip-spinning and the like.

The silicate binder of the present invention can contain potassium and lithium in a ratio of $K_2O:Li_2O$ ranging between 20:1 to 3:1, more preferably in the ratio of $K_2O:Li_2O$ ranging between 15:1 to 4:1, and most preferably in the ratio of $K_2O:Li_2O$ ranging between 11:1 to 7:1, with all ratios expressed herein by weight. The ratio of silicate to potassium $Si_2O:K_2O$ can range from 2:1 to 6:1, more preferably from 2:1 to 3:1, and most preferably from 2.4:1 to 2.8:1. The most preferable silicate composition can be represented by a weight ratio of $Si_2O:Me_2O$ ranging from 2.1:1 to 2.6:1 where $Me_2O=K_2O+Li_2O$. In a preferred embodiment, the aluminum powder is contained in the slurry in a range between about 20-60 weight %, more preferably 30-50 weight % and most preferably 35-45 weight %, based on the total weight of the slurry. The ratio of lithium-doped potassium silicate to aluminum powder, Li-doped K silicate:Al, in the slurries of the present invention ranges from about to 0.12:1 to 0.50:1, more preferably from 0.18:1 to 0.46:1 and most preferably, from 0.22:1 to 0.37:1.

As described in much detail in U.S. Pat. No. 9,017,464, aluminum particles that are employed in the slurries of the present invention, may be spherical inert-gas atomized, air atomized, flakes or mixtures thereof. The aluminum particles preferably have a size that is suitable to inter-disperse within the silicate-based binder. In one embodiment, the aluminum powder is air atomized and comprises a particle size distribution characterized in that the 50th percentile of the particle size distribution has a diameter of between about 4 to 7 microns and the $90^{th}$ percentile of the particle size distribution has a diameter of less than or equal to about 11.5-15.5 microns. In another embodiment, the spherical inert-gas atomized aluminum powder comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns. The particle size D50 and D90 numbers of the present invention as disclosed herein have been obtained via laser diffraction techniques employing MicroTrac SRA Particle Analyzer as a particle measuring equipment. As used herein, "D50" refers to a median particle size in which 50 percent of the particles are smaller and 50 percent are larger than the median particle size, and "D90" refers to a $90^{th}$ percentile particle size in which ninety percent of the particles are smaller than the $90^{th}$ percentile particle size.

The colloidal solution of nano-sized ceria particles when added to the slurry of the present invention, leads to the formation of the slurry-derived coating that is fully cured at temperatures below 500 degrees F., such as 400-450 degrees F. The colloidal solution can be added by various means, such as by direct admixing in the slurry or, preferably, by first spraying a layer of the slurry onto a substrate, treating the layer with the colloidal solution (such as by spraying the colloidal solution on top of the initial slurry layer), then drying and finally curing the resultant coating. The binder solution polymerizes and solidifies under a drying and reduced temperature curing cycle to form a continuous matrix with acceptable mechanical strength, flexibility and chemical resistance.

The surface morphology and microstructure of the coatings of the present invention will now be described. Scanning electron microscopy (SEM) and Energy-dispersive X-ray spectroscopy ("EDS") analysis were performed for investigation of surface morphology, microstructure and elemental composition for all of the Li-doped K silicate-based Cr-free coatings discussed herein in the as-cured state. FIGS. 4(a) and 4(b) show top view SEM images of the coatings surface with EDS analysis data at a magnification of ×1000; marks on the SEM images indicate areas from which elemental composition data were collected. Both coatings have Li-doped potassium silicate matrixes filled with Al particles; FIG. 4(a) presents data for the baseline coating that does not employ Ce oxide cure accelerator and is cured at 650 degrees F. for 30 minutes, in comparison with FIG. 4(b) that shows the coating of the present invention that comprises the Ce oxide cure accelerator and is cured at 450 degrees F. for 2 hours. As seen from the data, whereas the overall morphology of the coatings is the same, such that both coatings are formed by the silicate matrix with embedded Al particles, in FIG. 4b, the colloidal solution of cerium oxide impregnated the matrix during its application and formed the Ce-containing coating under reduced temperature cure, with a Ce-contained phase that appears as white on the SEM image and which is distributed throughout the coating, but concentrated substantially on the surface of Al particles.

As-cured Cr-free basecoats of the present invention, similar to the chromate-containing SermeTel W® benchmark and Cr-free base coatings disclosed in the U.S. Pat. No. 9,017,464, are not electrically conductive and thus are capable of providing only barrier protection, but not galvanic corrosion protection to the substrate. However, the coatings of the present invention can be made electrically conductive by any of the treatments widely used in the art for this purpose such as, for example, burnishing with glass beads or using an abrasive media, for example aluminum oxide abrasive, at low processing pressure. The treatments can therefore render the inventive coatings galvanically protective against corrosion to an underlying substrate. In this regard, resistivity of the burnished coatings of the present invention typically measures less than 5Ω, which is well below a value of less than 15Ω that is generally required by OEM specifications. The electrical resistance of burnished coatings is generally measured by a standard resistivity meter with the probes being placed on the surface of the coating one inch apart.

Microstructure of the burnished coatings of the present invention is also typical to what is known in the art to be produced by the burnishing process. FIGS. 5(a) and 5(b) show top view SEM micrographs at a magnification of ×500 and ×1000, respectively, for the coating burnished with $Al_2O_3$ abrasive media. Generally speaking, the energy imparted to the coating from the pressurized media particles during the burnishing alters the aluminum particle shape, thereby causing densification of the coating. As seen from FIGS. 5 (a, b), burnishing compresses the as-cured coating and forms a modified coating layer. Specifically, the compression imparts a substantial change in the coating surface microstructure. The aluminum particles are flattened, which results in coating densification and closure of the pores. These changes provide continuous contact between the aluminum particles, thereby rendering the coatings conductive.

As seen from SEM data for the coating cross-sections in the as-cured and burnished conditions (FIGS. 6 (a) and 6(b), respectively), the change in the coating microstructure under impact occurs not only on the surface, but also to a significant depth of about 15-20 µm. The denser, less porous layer of the burnished coating of FIG. 6b can provide the benefit of additional barrier protection for the substrate.

The coating of the present invention is generally applied to a thickness of between 0.5 to 3.0 mils, with a preferable thickness between 0.8 to 1.6 mils. Such a coating thickness can be built up in one cure cycle or multiple layers with two or more cure cycles, if desired. Preferably, each layer undergoes addition of the aforementioned nano-ceria cure catalyst. The minimum thickness is determined by a need to provide a continuous layer covering a substrate. The maximum thickness of the basecoat layer is generally determined by a targeted or specified thickness of the entire multilayer overlay system. It is customary and desirable not to apply a coating in excess of functional requirements for a particular application. For example, typical coating thicknesses for turbine compressor applications is less than 3 mils (75 µm), while on some components (such as, for example, compressor blades and vanes) the coating thickness should be typically less than 2 mils.

It should be understood that activation of the base coat of the present invention via burnishing with an abrasive media can be done not only as a final step of the application process, but also in-between the coating layers, such as after curing the first layer of the coating, then applying and curing the second layer of the coating. In this case, the first layer of the coating will be made conductive, thus capable of providing galvanic corrosion protection, whereas the second layer of the coating will stay non-conductive; as a result, overall sacrificial activity will be reduced and longer lasting.

Examples of microstructure of the coatings burnished after the first layer application can be seen from SEM data for the coating cross-section (FIG. 7): the first layer is much denser as a result of burnishing, whereas the top layer remains more porous.

It is important to notice that, as seen from the SEM cross-section data of FIGS. 6 and 7, in the cured coatings of the present invention Ce-containing phase derived from the treatment with the colloidal solution of nano-sized $CeO_2$ is distributed throughout the whole coating depth and substantially concentrated on the surface of Al particles embedded in the coating matrix. This might be an indication of a possible mechanism of cure accelerating action of the colloidal solution of nano-sized cerium oxide.

Indeed, cerium oxide nanoparticles containing materials have drawn much attention as catalysts and as structural and electronic promoters of heterogeneous catalytic reactions. This high catalytic activity of nano ceria arises from an easy transition of cerium atom from $Ce^{4+}$ to $Ce^{3+}$ oxidation states and formation of oxygen vacations in its crystalline lattice thus transitioning from $CeO_2$ to $CeO_{2-x}$ (where $0 \leq x \geq 1$) during redox reactions. Recently, numerous experimental confirmations and mechanism investigations of this unique catalytic ability have been reported (such as by Pan Ni, et. al. in RSC Advances, 2015, v. 5, pp. 97512-97519). Autocatalytic behavior of nano ceria in aqueous solutions has also been presented as follows (See review paper by Can Xu, et. al, NPG Asia Materials, 2014, v. 6, pp. 1-16):

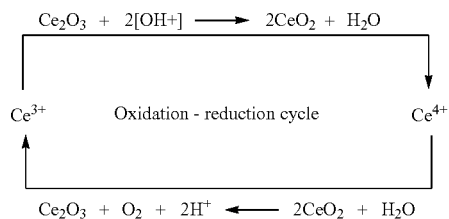

In order to confirm a unique role of colloidal nano ceria as a cure accelerator of the coatings of the present invention, the Applicants conducted the following experiments. First, instead of employing the colloidal solution of nano ceria, Applicants conducted an experiment and used a colloidal solution of nano sized particles of titania $TiO_2$ with similar particle size to that of ceria. In another experiment, Applicants employed a solution of Ce nitrate $Ce(NO_3)_3$ instead of the colloidal solution of nano ceria. The results in both cases were negative: the coatings cured at 450 degrees F. failed after the Salt Spray test (FIGS. 8(a) and 8(c)) after a relatively short exposure time, and also failed under exposure to boiling water (FIGS. 8(b) and 8(d)). Thus, Applicants validated that colloidal nano ceria is unique as it specifically possesses cure catalyzing activity for the aluminum filled lithium-doped potassium silicate slurry compositions of the present invention.

Not to be bound by any theory, Applicants suggest that the aforementioned unique oxidizing properties of cerium oxide nanoparticles are responsible for possible in-situ formation of a thin, active oxide-hydroxide layer on the surface of Al particles, as well as for —Si—O—Ce— bond formation with the silicate matrix via surface interaction of ceria particles with silicate species, thus catalyzing the formation of strong bonding of metal particles with silicate-based polymeric matrix that in turn is resulting in the coating's ability to be fully cured at lower temperatures.

In a preferred embodiment, although slurry compositions of the present invention are particularly useful for forming basecoat compositions when combined with aluminum particulates, it should be recognized that the present invention contemplates the use of any suitable metallic particulates. For example, fine particles of various aluminum alloys (such as aluminum-silicon, aluminum-copper or aluminum-magnesium) can be used with the lithium-doped potassium silicate-based binder of the present invention. Other illustrative metal powders that can be used in the slurry and coating compositions are zinc, nickel and silicon. The selection of the specific type of metal powder can be dependent upon numerous factors, including the functional properties desired in the end-use application and the properties resulting from utilizing any of these metal powders.

Moreover, as it was discovered in the present invention and will be demonstrated by the Examples, when zinc metal particles were partially substituted for Al metal particles, the full cure of the coatings obtained from the lithium doped potassium silicate binder-based slurries was achieved at even lower temperatures, such as 350 degrees F. Without being bound by any particular theory, this discovery might be explained by the ability of Zn particles to be easily oxidized by the colloidal solution of nano ceria with formation of an active surface oxide layer that in turn bonds readily with the silicate matrix.

As will be shown and discussed below in the Examples, the inventors have performed extensive testing to confirm that the Cr(VI)-free slurry compositions of the present invention when treated with the colloidal solutions of nano-sized ceria produced fully cured coatings at reduced temperatures of below 500 degrees F., with the coatings meeting performance requirements set forward by OEM specifications for low-temperature cured legacy Cr(VI) containing SermeTel® coatings currently employed in the field, such as galvanic, sacrificial corrosion protection for components composed from materials that cannot be exposed to the normal SermeTel® cure temperatures of above 500 degrees F.

In particular, a battery of specific, rather demanding tests was performed to evaluate protective properties of the coatings of the present invention. Typically, OEM requirements include relatively high corrosion resistance, sacrificial toward base metal (i.e., coated and scribed "X" panels should not show any metal substrate rusting for up to 1,000 hours in ASTM B117 Salt Spray tests), as well as resistance to hot water and engine fluids exposure.

Each of the coatings in the Examples below were applied onto respective substrates and cured at reduced temperatures of below 500 degrees F. Specifically, panels of low-carbon 1008/1010 steel or 4130 low-alloy steel were initially surface treated by grit-blasting with 100 mesh grit. The slurry to be tested was then sprayed onto the panels. Thereafter, according to the preferred embodiment, the slurry was allowed to dry at 175 F for 15 min, treated with the colloidal solution of nano-sized ceria and then cured at 350-450 degrees F. to form a coating layer.

Mechanical and functional properties of the prepared coatings were tested as follows. Coatings adhesion to a substrate and inter-layer adhesion were tested by cross-hatch tape (per ASTM D3359) and bend tests. In ASTM D3359 test method, a crosscut grid of scribe lines 1 mm apart was cut into the coating through to the substrate. Standard adhesive tape as defined by ASTM D3359 was then applied to the grid and peeled back at 180° angle. Adhesion was determined by the amount of coating removed by the tape. Also, optical microscope evaluation (×6) of the cross-hatch region was performed and found to be very informative. In the bend test, a 90° bend of a coated panel around a 0.22" diameter mandrel was performed followed by evaluation of the area around the bend for any defects such as cracking, peeling or delamination.

Salt Spray testing of burnished (220 mesh grit) & scribed coatings on 1010 panels was performed per ASTM B117 for at least 1000 hours, and in some cases, over 1,500 hours.

Heat resistance of the coatings on 4130 panels was tested at 850 degrees F. for 168 hours.

With regards to the hot water resistance test, coatings on 1010 panels were placed in boiling H2O for 10 min, then cooled and air-dried for 3 hours, followed by cross-hatch and bend adhesion tests performed as described above.

The fuel resistance test was performed on coated 1010 panels immersed in Fuel B fluid for 4 hours at room temperature.

Also, resistance to hydraulic fluid has been tested on coated panels by immersion in Skydrol 500 for 100 hours at test temperature of 160 degrees F.

While the preferred embodiments of the inventive slurry and coating formulation has been set forth above, the following examples are intended to provide a basis for better understanding of properties and functions of the inventive slurries and coatings, as well as to demonstrate that said coatings perform on par with the benchmark Cr(VI) containing low-temperature cured base coatings, such as SermeTel® 984 and SermeTel® 1460. However, the following examples are not to be construed as limiting the invention.

Example 1

In accordance with the principles of the present invention, the colloidal solution of nano-sized ceria was employed as a cure catalyst for Li-doped Potassium silicate binder based, Aluminum pigment filled coating. The colloidal solution had a pH of about 9, and 20 weight percent content of ceria particles, and the mean size of the ceria particles was less than 5 nanometers. The nano-sized cerium oxide colloidal solution will be further referred to herein as "NCeOC". First, the Li-doped Potassium silicate-based, Cr-free slurry was prepared; the slurry comprised an aqueous solution of Li-doped K silicate having a $Si_2O:Me_2O$ weight ratio of 2.4:1 where $Me_2O=K_2O+Li_2O$, and the ratio of $K_2O:Li_2O=8.2:1$ by weight. Aluminum powder employed in the slurry was in the form of spherical inert-gas atomized Al particles that comprised a particle size distribution characterized in that the $50^{th}$ percentile of the particle size distribution had a diameter of between about 3.9 to 4.5 microns and the $90^{th}$ percentile of the particle size distribution had a diameter of less than or equal to about 9.0 microns. The Al content was 44 wt. %, based on the overall weight of the slurry such that the ratio of Silicate:Al was equal to 0.25:1. The slurry was applied onto steel 1008/1010 panels as described above, to form a coating layer; this layer was dried at 175 degrees F. for 15 min, then the colloidal solution of NCeOC was sprayed on top of this dried layer, dried again at 175 degrees F. and then the coating was cured at 450 degrees F. for 2 hours. The above process was repeated to get the total coating thickness of 1.3-1.6 mils; the produced coatings exhibited smooth, uniform surfaces with the roughness Ra of about 22-24 microinch. The coatings were subsequently tested.

The chemical composition of the coating of Example 1 was tested by EDS analysis and compared with the coatings applied from the same exact slurry, but without employing NCeOC, as shown in FIG. 1. The coatings of FIG. 1 were not capable of being fully cured at 450 degrees F. As a result, they blistered under relatively short exposure to the Salt Spray test. As seen from EDS spectra on FIGS. 4(a) and 4(b), the composition of the coatings of FIG. 1 are different from the coating of Example 1 that was treated with the cure accelerator, such that the coating of Example 1 comprises an additional, cerium containing phase (FIG. 4 b) that is absent from that of FIG. 4a.

According to the EDS data collected from the cross-section SEM of the NCeOC treated coating cured at 450 degrees F. for 2 hours (see FIG. 6a), the composition of the as-cured coating measured at different cross-section locations comprises cerium-containing phase that ranged in an amount of about 4 to about 7 atomic percent. The full tabulated results are shown below in Table 1.

TABLE 1

Chemical composition from EDS analysis of as-cured coating with NCeOC

| Element, at. % | O | Al | Si | K | Ce |
| --- | --- | --- | --- | --- | --- |
| Full Area | 12.7 | 73.9 | 7.6 | 2.0 | 3.7 |
| Area 2 | 13.4 | 73.8 | 9.2 | | 3.7 |
| Area 3 | 12.1 | 74.8 | 7.5 | 2.0 | 3.6 |
| Area 4 | 10.0 | 73.0 | 6.0 | 2.1 | 7.4 |

The coating of Example 1 demonstrated acceptable adhesion to the steel substrates in both cross-hatch and bend adhesion tests (FIG. 9) that were superior to the coatings of FIG. 1 which did not employ NCeOC.

The coating of Example 1 was burnished with abrasive media (220 mesh size $Al_2O_3$) after application and cure of a second layer (see FIG. 6b); the composition after burnishing was rather similar, with a content of cerium-containing phase that ranged in an amount from about 3 to about 8 atomic percent. The full tabulated results are shown in Table 2.

TABLE 2

Chemical composition from EDS analysis of burnished coating

| Element, at. % | O | Al | Si | K | Ce |
| --- | --- | --- | --- | --- | --- |
| Full Area | 11.4 | 72.4 | 5.3 | 2.9 | 8.0 |
| Area 4 | 11.3 | 65.3 | 9.0 | 3.1 | 3.1 |
| Area 8 | 4.9 | 80.2 | 1.2 | 1.2 | 3.5 |

The performance in corrosion resistance testing was observed to be acceptable for the inventive coatings treated with NCeOC and then cured at reduced cure temperatures. The performance results were superior to those of coatings applied from the same exact slurry, but without employing NCeOC. As shown in FIGS. 3(a) and 3(b), the coating of Example 1 demonstrated an absence of red rust in the scribe or field after being exposed to the salt fog for more than 1,700 hours. No blistering of the coating was observed, thus confirming that a complete cure of the silicate matrix had been achieved at 450 degrees F. temperature.

Example 2

The coating of Example 2 had been applied from the same Li-doped Potassium silicate-based, Cr-free slurry as in Example 1, and then similarly treated with NCeOC and cured at 450 degrees F. for 2 hours. In this Example, burnishing with the abrasive media was performed after curing the first layer of the coating, and then the second layer of the coating was applied and cured similarly to the first layer. The microstructure of this coating was as shown in FIG. 7; according to the EDS analysis, a content of cerium-containing phase ranged from about 5 to about 19 atomic percent throughout the coating cross-section. The full tabulated results are shown below in Table 3.

The coating of Example 2 demonstrated acceptable adhesion to the substrate and interlayer adhesion, as well as acceptable resistance to the Salt Fog (FIGS. 10(a), 10(b), 10(c), 10(d)) with no development of the blistering or red rust after over 1700 hours of exposure; formation of sacrificial corrosion products on the surface led to some darker discoloration of the coating that was not considered to be a failure.

TABLE 3

Chemical composition from EDS analysis of the coating in Example 2

| Element, at. % | O | Al | Si | K | Ce |
| --- | --- | --- | --- | --- | --- |
| Full Area | 8.6 | 76.1 | 6.6 | 1.3 | 7.4 |
| Area 2 | 7.2 | 79.9 | 6.4 | 1.1 | 5.5 |
| Area 3 | 8.9 | 74.4 | 5.9 | 1.0 | 9.9 |
| Area 4 | 10.2 | 73.7 | 5.0 | 1.2 | 9.9 |
| Area 5 | 5.5 | 84.1 | 3.8 | 1.2 | 5.4 |

Example 3

Figure 12B:
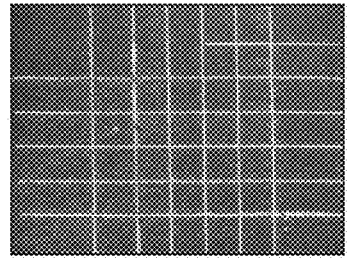
Figure 12C:
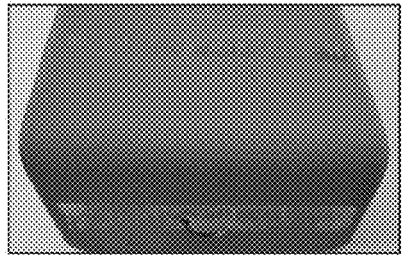
Figure 13A:
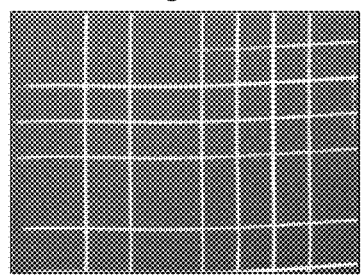
FIGS. 13 (a) and 13 (b) show results of cross-hatch and bend adhesion tests performed on the coating of Example 1 of the present invention after heat exposure test.
Figure 13B:
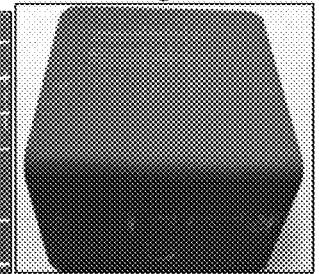
Figure 14A:
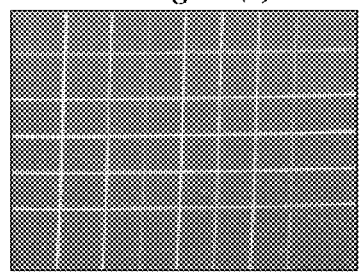
FIGS. 14 (a) and 14 (b) show results of cross-hatch and bend adhesion tests performed on the coating of Example 2 of the present invention after heat exposure test.
Figure 14B:
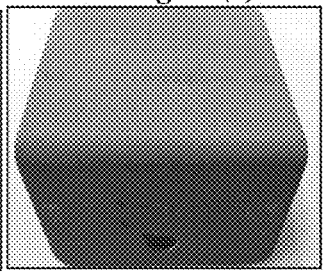

The coatings of the present invention were further tested with the purpose of verification that their functional performance meets requirements set forth by various OEM specifications for low-temperature cured legacy Cr(VI) containing overlay coatings, such as commercial SermeTel®984 base coat. Hot water immersion tests were conducted in which coatings of Examples 1 and 2 were placed in boiling water for 10 min, then cooled and air-dried for 3 hours, followed by cross-hatch and bend adhesion tests. The hot water immersion tests are severe tests that expose any deficiencies in a coating cure completeness, as well as the coating's adhesion to a substrate and interlayer adhesion. FIGS. 11(a), 11(b) and 11(c) show surface morphology (optical microscope at 40× magnification), as well as the results of cross-hatch (optical microscope at 6× magnification) and bend adhesion tests of the coating of Example 1 after hot water immersion testing; FIGS. 12(a), 12(b) and 12(c) show the data for the coating of Example 2. As seen from these data, the coatings of the present invention were not affected by boiling water exposure: no blistering, and no delamination between layers was observed, thus verifying that a full cure was achieved at a reduced temperature of 450 degrees F. due to employment of NCeOC.

It was also determined that all coatings of the present invention exhibited superior heat oxidation resistance, characterized by no observed coating color change, blistering or delamination from a substrate after 168 hours of heat exposure at 850 degrees F. The conditions of the test were set in accordance with OEM specifications for the legacy, Cr(VI) containing SermeTel® 984 coating cured at the same reduced temperature, which was also used as a benchmark for these immersion tests: the coatings of the present invention performed similarly to the benchmark.

FIGS. 13(a), 13(b), 14(a) and 14(b) show the results of cross-hatch (optical microscope at 6× magnification) and bend adhesion tests performed after heat exposure of the coating of Example 1 and Example 2, respectively.

Resistance to a standard engine fuel is needed for a coating service in aircraft applications. Accordingly, the Fuel B immersion test was performed on coatings of Example 1 and Example 2: the coated panels were immersed in engine Fuel B test fluid for 4 hours at room temperature, and then were subjected to the adhesion tests. No blistering, spallation or any deterioration of adhesion was observed, as presented in FIGS. 15(a), 15(b), 16(a) and 16(b): again, the coatings of the present invention performed similarly to the abovementioned benchmark coating.

Example 4

As it was surprisingly discovered in the present invention, when zinc metal particles were partially substituted for Al metal particles, the full cure of the coatings obtained from the lithium doped potassium silicate binder-based slurries and treated with NCeOC was achieved at even lower temperatures, such as 350 degrees F. This discovery has been illustrated by the following Example 4.

The coatings of Example 4 were prepared as follows. First, the Li-doped Potassium silicate-based, Cr-free slurries, designated as "A", "B", "C" and "D" were prepared; each of the slurries comprised an aqueous solution of Li-doped K silicate having a $Si_2O:Me_2O$ weight ratio of 2.4:1 where $Me_2O=K_2O+Li_2O$, and a ratio of $K_2O:Li_2O=8.2:1$ by weight. The same Aluminum powder as in the previous Examples 1 through 3 was employed in these slurries. However, Zinc powder was also employed in the slurry, and in a size range of 4.9-6.4 microns, typically of 5.5 microns in size. Zn particles were partially substituted for Al particles in various Al:Zn weight ratios (see Table 4); the total content of metal particles M=Al+Zn in the slurries A through D was kept constant at about 44 weight %, based on the overall weight of the slurry such that the ratio of Silicate:M in the aqueous slurries was equal to about 0.25:1.

TABLE 4

Chemical composition of Lithium-doped Potassium Silicate binder based slurries of Example 4 with various Al: Zn ratios

| Coating Formulation | Zn content, weight % | Al content, weight % | Ratio of Al/Zn | M content, weight % |
|---|---|---|---|---|
| A | 4.76 | 39.68 | 8:1 | 44.44 |
| B | 8.73 | 35.71 | 4:1 | 44.44 |
| C | 13.29 | 31.15 | 2:1 | 44.44 |
| D | 22.22 | 22.22 | 1:1 | 44.44 |

Each of the slurries "A", "B", "C", and "D" was applied onto steel 1008/1010 panels as described above, to form a corresponding coating layer with similar designation "A", "B", "C" and "D"; each of the corresponding coating layers was dried at 175 degrees F. for 15 min, then the colloidal solution of NCeOC was sprayed on top of each of the corresponding dried layers, dried again at 175 degrees F. and then the corresponding coatings were cured at 350 degrees F. for 4 hours. The above process was repeated to get the total coating thickness of 1.1-1.5 mils for each corresponding coating; each of the produced coatings exhibited smooth, uniform surface with the roughness Ra of about 30-40 microinches.

The coatings "A", "B", "C" and "D" produced from their corresponding slurries "A", "B", "C" and "D" were subsequently tested for completeness of cure by exposure to the boiling water test (i.e., water immersion test as described above), followed by cross-hatch and bend adhesion tests. All of the coatings "A", "B", "C" and "D" passed the test: absence of coating loss, acceptable cross-hatch adhesion and no spallation on the bend validated that a complete cure had been achieved at the temperature as low as 350 degrees F. FIGS. 17(a) through (d) present results of the cross-hatched coatings as were examined under optical microscope with ×6 magnification.

Example 5

The coatings "A", "B", "C", "D" of Example 4 produced from their corresponding slurries were activated by burnishing with $Al_2O_3$ abrasive media performed after curing the second layer of each of the coatings. Next, the coatings were tested for corrosion resistance per ASTM B117. As demonstrated by the FIGS. 18(a) through (d), after exposure times of 1,100 hours, none of the coatings developed any blistering or red rust in the field or scribe. In this case, white sacrificial corrosion products were formed on the surface of each of the coatings that was not considered to be a failure.

Coating C that was produced from Slurry C, as described in Example 4, was exposed to the Salt fog for up to 2,550 hours in an incremental manner. 2,550 hours exposure exceeds more than two times the generally recognized standard exposure time required by most of the OEM specifications for this test. FIGS. 19 (a) through (f) show Coating C at different exposure times: as seen from the data, Coating C of the present invention was fully cured at 350 degrees F. for 4 hours and exhibited an acceptable resistance to the Salt Fog with no development of the blistering or red rust in the field or scribe even after 2,550 hours of exposure. Formation of white sacrificial corrosion products on the surface was observed but is typical for all SermeTel® base coats (including legacy Cr(VI) containing base coats) where the coating activation by burnishing with $Al_2O_3$ abrasive media is performed after curing the second layer of the coating. As well known in the art and mentioned hereinbefore, formation of these white sacrificial corrosion products is not considered to be a failure and the longer the exposure time of a sacrificial coating to the Salt fog environment, the higher the amount of the sacrificial corrosion products that are formed.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. An aqueous slurry composition for the production of a coating on a substrate comprising:
   a binder comprising an aqueous solution of lithium doped potassium silicate, the binder characterized by an absence of chromium;
   an aluminum powder or an aluminum alloy powder incorporated into the binder; and a cure catalyst comprising nano-sized cerium oxide colloidal solution.

2. The aqueous slurry composition of claim 1, wherein the aluminum powder and the binder or the aluminum alloy powder and the binder are contained as a one-part composition.

3. The aqueous slurry composition of claim 1, wherein the nano-sized cerium oxide colloidal solution is stored separately from the mixture of the binder with the aluminum powder.

4. The aqueous slurry composition of claim 1, wherein the lithium doped potassium silicate and aluminum or aluminum alloy powder in the slurry are contained in a weight ratio of about 0.12:1 to 0.50:1 silicate to the aluminum or the aluminum alloy powder.

5. An aqueous slurry composition for the production of a coating on a substrate comprising:
a binder comprising an aqueous solution of lithium doped potassium silicate, the binder characterized by an absence of chromium;
a zinc powder in combination with an aluminum or an aluminum alloy powder; and
a cure catalyst accelerator comprising a nano-sized cerium oxide colloidal solution.

6. The aqueous slurry composition of claim 5, wherein the aluminum or aluminum alloy powder in the slurry comprises a particle size distribution characterized in that the 50th percentile of the particle size distribution has a diameter of between about 4 to 7 microns and the 90th percentile of the particle size distribution has a diameter of less than or equal to about 11.5-15.5 microns.

7. The aqueous slurry composition of claim 5, wherein the nano-sized cerium oxide colloidal solution is stored separately from the binder with the zinc powder in combination with the aluminum powder or the aluminum alloy powder.

8. The aqueous slurry composition of claim 5, wherein the lithium doped potassium silicate binder comprises the zinc powder in combination with the aluminum or the aluminum alloy powder in the slurry, wherein a weight ratio of Al/Zn is of about 8:1 to 1:1.

9. The aqueous slurry composition of claim 5, wherein the zinc powder is incorporated into the binder in a predetermined weight ratio of Al/Zn of about 8:1 to 1:1, and the aluminum or the aluminum alloy powder is incorporated into the binder in a predetermined weight ratio of the binder to the aluminum or the aluminum alloy powder of about 0.12:1 to 0.50:1.

10. A coating composition for a substrate comprising:
a ceramic matrix not containing chromium, said matrix formed by a silicate binder, wherein said silicate binder is a potassium silicate doped with lithium;
a plurality of aluminum-containing particles embedded within said matrix; and
a cerium-containing compound, said cerium-containing compound impregnated into the ceramic matrix as a cerium-containing phase.

11. The coating composition of claim 10, wherein at least a portion of the cerium-containing phase is distributed along a surface of the aluminum-containing particles.

12. The coating composition of claim 10, wherein the cerium-containing phase extends along a substantial portion of the depth of the coating.

13. The coating composition of claim 10, wherein the cerium ranges in an amount from about 4 to about 7 atomic wt. % of the coating as-cured, as determined by energy-dispersive X-ray spectroscopy (EDS) analysis.

14. The coating composition of claim 10, wherein the cerium ranges in an amount from about 3 to about 8 atomic wt. % of the coating as burnished, as determined by EDS analysis.

15. A coating composition for a substrate comprising:
a ceramic matrix not containing chromium, said matrix formed by a silicate binder, wherein said silicate binder is potassium silicate doped with lithium;
a plurality of aluminum-containing and zinc-containing particles embedded within said matrix; and
a cerium-containing compound, said cerium-containing compound impregnated into the ceramic matrix as a cerium-containing phase.

16. The coating composition of claim 15, wherein at least a portion of the cerium-containing phase is distributed along a surface of the aluminum-containing and/or the zinc-containing particles.

17. The coating composition of claim 15, wherein the cerium-containing phase extends along a substantial portion of the depth of the coating.

18. A method for applying a coating onto a substrate comprising:
providing an aqueous one-part slurry comprising:
a lithium doped potassium silicate binder, the binder characterized by an absence of chromium; and
an aluminum-containing powder incorporated into the binder in a predetermined weight ratio of the binder to the aluminum-containing powder;
applying the aqueous one-part slurry onto a surface of the substrate;
treating the applied layer of the aqueous one-part slurry with a colloidal solution of a nano-sized cerium oxide to form a basecoat layer; and
curing the basecoat layer.

19. The method of claim 18, wherein the curing of the basecoat layer occurs at below about 500 degrees F.

20. The method of claim 18, wherein the aqueous one-part slurry is dried prior to treating the aqueous one-part slurry with the colloidal solution of the nano-sized cerium oxide.

21. A method for applying a coating onto a substrate comprising:
providing an aqueous one-part slurry comprising:
a lithium doped potassium silicate binder, the binder characterized by an absence of chromium; and
an aluminum-containing powder incorporated into the binder in a predetermined weight ratio of the binder to the aluminum-containing powder; and
a zinc-containing powder incorporated into the binder in a predetermined weight ratio of the aluminum containing powder to the zinc-containing powder;
applying the aqueous one-part slurry onto a surface of the substrate;
treating the applied layer of the aqueous one-part slurry with a colloidal solution of a nano-sized cerium oxide to form a basecoat layer; and
curing the basecoat layer.

22. The method of claim 21, wherein the curing of the basecoat layer occurs at below about 400 degrees F.

23. A method for applying a coating onto a substrate comprising:
providing an aqueous one-part slurry comprising:
a lithium doped potassium silicate binder, the binder characterized by an absence of chromium, and
an aluminum-containing powder, said aluminum-containing powder incorporated into the binder in a predetermined weight ratio of the binder to the aluminum-containing powder;

introducing a colloidal solution of a nano-sized cerium oxide into the aqueous one-part slurry to form a mixture; and applying the mixture onto a surface of the substrate to form a basecoat layer; and curing the basecoat layer.

24. The method of claim 23, wherein the aqueous one-part slurry further comprises zinc-containing powder.

* * * * *